(12) United States Patent
Storkamp et al.

(10) Patent No.: US 6,958,701 B1
(45) Date of Patent: Oct. 25, 2005

(54) TRANSPORTATION MONITORING SYSTEM FOR DETECTING THE APPROACH OF A SPECIFIC VEHICLE

(76) Inventors: John D. Storkamp, 1713 Highland Trail, St. Cloud, Stearns, MN (US) 56301; Mark A. Storkamp, 917 13th Ave. South, St. Cloud, Stearns, MN (US) 56301; Ronald H. Menzhuber, 3078 16th St. NW., New Brighton, MN (US) 55112

( * ) Notice: Subject to any disclaimer, the term of this patent is extended or adjusted under 35 U.S.C. 154(b) by 44 days.

(21) Appl. No.: 10/454,903

(22) Filed: Jun. 4, 2003

Related U.S. Application Data

(60) Provisional application No. 60/385,741, filed on Jun. 5, 2002.

(51) Int. Cl.[7] ............................................. G08G 1/123
(52) U.S. Cl. ...................... 340/794; 340/992; 340/993; 701/207; 246/122 R
(58) Field of Search ................................ 340/994, 944, 340/426.13, 426.17, 426.35, 426.36, 992, 340/993; 701/207; 246/122 R

(56) References Cited

U.S. PATENT DOCUMENTS

| | | | | |
|---|---|---|---|---|
| 3,568,161 | A * | 3/1971 | Knickel | .................... 340/992 |
| 4,297,672 | A | 10/1981 | Fruchey et al. | |
| 4,325,057 | A * | 4/1982 | Bishop | ........................ 340/994 |
| 4,350,969 | A | 9/1982 | Greer | |
| 4,713,661 | A | 12/1987 | Boone et al. | |
| 5,021,780 | A | 6/1991 | Fabiano et al. | |
| 5,144,301 | A | 9/1992 | Jackson et al. | |
| 5,150,310 | A * | 9/1992 | Greenspun et al. | ......... 342/451 |
| 5,400,020 | A | 3/1995 | Jones et al. | |
| 5,483,234 | A * | 1/1996 | Carreel et al. | ............... 340/994 |
| 5,483,454 | A * | 1/1996 | Lewiner et al. | ............. 701/200 |
| 5,493,295 | A * | 2/1996 | Lewiner et al. | ............. 340/994 |
| 5,623,260 | A | 4/1997 | Jones | |
| 5,657,010 | A | 8/1997 | Jones | |
| 5,680,119 | A | 10/1997 | Magliari et al. | |
| 5,736,940 | A * | 4/1998 | Burgener | ..................... 340/994 |
| 5,739,774 | A * | 4/1998 | Olandesi | ..................... 340/994 |
| 5,774,072 | A | 6/1998 | Wu | |
| 6,006,159 | A * | 12/1999 | Schmier et al. | ............. 701/200 |
| 6,184,802 | B1 | 2/2001 | Lamb | |
| 6,191,708 | B1 | 2/2001 | Davidson | |
| 6,313,760 | B1 | 11/2001 | Jones | |
| 6,317,060 | B1 | 11/2001 | Jones | |
| 6,459,989 | B1 * | 10/2002 | Kirkpatrick et al. | ........ 701/215 |
| 6,636,160 | B2 * | 10/2003 | Brei | ........................... 340/994 |

* cited by examiner

Primary Examiner—Daniel Wu
Assistant Examiner—Samuel J. Walk
(74) Attorney, Agent, or Firm—Albert W. Watkins

(57) ABSTRACT

A system and apparatus for detecting the approach of a vehicle includes an encoded signal which identifies a vehicle or route, and which is used to distinguish from different vehicles and routes. A receiver detects transmission signals above a threshold level, and responsive to reception thereof checks for one or a plurality of codes that identify particular vehicles of interest. When a desired signal is received, an alarm or indicator is generated that alerts a person. When the indicator is terminated, a lock-out period prevents undesired re-activation of the alarm or indicator based upon the same code. Unique headers enable transmission and exchange of additional data, and logical text may be provided which enables more ready viewing of coded information. The present invention has industrial applicability to public and private transportation systems, whether for passengers or other cargo.

18 Claims, 3 Drawing Sheets

TRANSPORTATION MONITORING SYSTEM FOR DETECTING THE APPROACH OF A SPECIFIC VEHICLE

CROSS REFERENCE TO RELATED APPLICATIONS

This application claims priority to U.S. provisional application Ser. No. 60/385,741 filed Jun. 5, 2002 and abandoned herewith, the contents which are incorporated herein by reference in entirety.

BACKGROUND OF THE INVENTION

1. Field of the Invention

This invention pertains generally to electrical communications, and more specifically to vehicle position indicators that signal a vehicle's anticipated arrival. In one more specific manifestation, the indicators are for school buses or other similar public transportation, though other manifestations are also described.

2. Description of the Related Art

Many different modes of transportation exist that utilize an operator, such as a driver, engineer or other ones of the myriad of names provided for such persons, and a vehicle to transport one or more passengers from one location to another. Operator-controlled transportation brings many universally recognized benefits. Among them are the conservation of energy, which is particularly beneficial in such instances as buses, light and heavy rail and the like. These mass transit systems also preserve real-estate by carrying many passengers in a single line in an efficient manner, while not requiring any associated automobile parking space. Where parking may be limited or completely unavailable, such as is common in larger cities or in special locations or facilities, such types of transportation may be the only viable mode of travel. Finally, in the cases of more private methods such as taxi cabs and the like, transportation is frequently made available where it would have otherwise not been possible or practical.

Nevertheless, operator-controlled transportation has, in many cases, garnered a reputation as eing somewhat less convenient than personal transportation for most ordinary trips. This is because the passenger must be at a pick-up location and ready for boarding well in advance of the anticipated arrival of the vehicle. This adds additional time to the trip, and also exposes the passenger to the vagaries of the environment. Such early arrival is necessitated since many of these vehicles will have a slightly variable arrival and departure time, and these vehicles will preferably not wait at any stops. Waiting at a stop would undesirably prolong the trip made by the vehicle, which would only add to the travel time and consequent inconvenience of this type of transportation for all passengers. Furthermore, the additional time to travel a route will also necessitates additional billing to compensate the operator, and reduce the availability of the vehicle for covering either the same or other routes. This is particularly true in the instance of more private modes of transportation, such as taxi cabs or the like, where wait times may be directly billed to the passenger.

Beyond inconvenience and minor added expense, and for many passengers an issue of greatest paramount, is the issue of safety. There are many locations where public transportation must be provided but cannot economically be provided with adequate security to ensure the safety of all passengers. One particular instance is the bus stop, which often serves as the gathering point for many diverse persons. All too often, these persons are for one reason or another more vulnerable than most. One particular instance is that of a school bus stop, where very young or small children must gather and wait for the school bus or where they will be dropped a the end of the school day. Unfortunately, these bus stops are scattered all about the country-side, from street corners to rural locations. Since the only persons traveling are school aged children, and since in many school districts transportation may be provided at different times for different age groups, it is entirely possible for kindergarten or elementary school children to be the only passengers at a stop. Further compounding the matter, at some times of the year and in some localities, the pick-up or drop-off times will be outside of daylight. While many times it is possible for the districts to avoid such scheduling, there are still some instances where this occurs. During these times, the young children are very vulnerable. Even with adults, a single or few passengers may be vulnerable and consequently unsafe.

In order to improve the safety and convenience of operator-controlled transportation systems, a number of systems have been developed which notify a passenger of an impending arrival of a vehicle. These systems are desirable since the transit time may be reduced, by reducing the amount of waiting at a pick-up or vehicle stop. Safety is improved, since the passenger is exposed for less time, and the vagaries of the environment, such as rain or the like, are somewhat less consequential. Where an individual will be picked up at their residence, or nearby, such systems provide ample advance notice for the passenger to be ready just as the vehicle arrives. This improves the efficiency and safety of the transit system for all.

Exemplary of the prior art systems, and each incorporated herein by reference for their specific teachings, are U.S. Pat. No. 5,021,780 to Fabiano et al; U.S. Pat. No. 4,325,057 to Bishop; U.S. Pat. No. 4,297,672 to Fruchey et al; U.S. Pat. No. 4,713,661 to Boone et al; U.S. Pat. No. 6,191,708 to Davidson; U.S. Pat. No. 4,350,969 to Greer; U.S. Pat. No. 5,144,301 to Jackson et al; U.S. Pat. No. 5,400,020 to Jones et al; U.S. Pat. No. 5,680,119 to Magliari et al; and U.S. Pat. No. 6,184,802 to Lamb. The patents of the prior art may somewhat generally be grouped according to the techniques which are provided to enable advance notice. One approach, illustrated by Jackson et al, is to use a low-power transmitter which triggers an audible or visual signal when close enough to a receiver. This technique requires very little capital cost, and may therefore be implemented readily by many transit systems and providers. However, there are few available unique frequencies in the radio spectrum, and interfering signals can cause the receiver to falsely trigger. In areas where several transportation vehicles will simultaneously operate, it can be extremely difficult to avoid triggering from the wrong vehicle. Such false alerts render the system relatively ineffective for all but the most rural of routes.

One approach which avoids the false triggering is illustrated, for exemplary purposes, by Jones et al. Using this system, a transportation vehicle is provided with relatively advanced electronics that may, for example, employ position detection systems such as GPS, Loran or the like, together with various sensors to detect the status of the transit vehicle. The transit vehicle may then be monitored for movement, and an arrival schedule predicted with some reliability. Passengers then subscribe to the system provider, who may use an automated dialing system with unique ring to notify the passengers at the appropriate time that the transit vehicle is approaching. For systems with fewer subscribers, this type of system offers several advantages. First of all, the location and status of each transit vehicle may be monitored very accurately. The relatively high capital cost of the equipment is limited to the transit vehicles, and not further multiplied by any passenger equipment. Unfortunately, when volumes of passengers increase, the amount of time required for timely notification also increases. Said another way, while everything is conveniently centralized, the load upon the central system may increase to a level which is greater than that which may be managed. Consequently, as the numbers of subscribing passengers increase, the system becomes substantially more expensive and more difficult to operate and maintain.

In all of these prior art systems, there is little in the way of flexibility provided to the subscriber, beyond how much advance notice the subscriber wishes to receive. Consequently, these systems are optimized for mass transit systems which are simply announcing the anticipated arrival of the transit vehicle at a particular stop.

SUMMARY OF THE INVENTION

In a first manifestation, the invention is a system for detecting the approach of a vehicle. Within the system, a vehicle transmitter operatively transmits at least one code. A code generator generates a representative code selected from a plurality of codes which is representative of the vehicle transmitter and discernable from others of the plurality of codes. The code generator is operatively coupled to the vehicle transmitter, to thereby couple the representative code to vehicle transmitter for transmission of a signal therefrom. A receiver remote from the vehicle transmitter has a signal receiver operatively monitoring for transmitted signals at a signal strength of at least a first threshold. A code demodulator responds to the signal receiver and extracts representative code from such a signal. A code detector compares the representative code to at least one user-selected code and generates an indication of identity therewith.

In a second manifestation, the invention is a means for alerting a person to a location of a transmitter at a first instant of time. The alerting means has a transmitter, and also a receiver spatially disparate to the transmitter. Both transmitter and receiver are tuned to a common transmission signal. A threshold of the common transmission signal is detectable by the receiver, and a code carried by the common transmission signal identifying the transmitter is also detectable by the receiver. A means within the receiver is provided for comparing the code to stored values and responsive to a match therewith generating a signal indicative of a match.

OBJECTS OF THE INVENTION

Exemplary embodiments of the present invention solve inadequacies of the prior art by providing an amplitude activated, code controlled receiver which uses unique headers that enable special communications and functions between transmitter and receiver. The receiver is also preferably provided with an ability to lock out the receiver for a particular interval to prevent undesirable re-triggering by the same vehicle, and to be able to trigger on and identify more than one transit vehicle at a time. Where necessitated, RF collision detection and avoidance may also be incorporated.

A first object of the invention is to provide an enhanced transportation monitoring and alerting system. A second object of the invention is to provide the enhancements using a combination of existing low-cost and proven approaches, integrated with several novel key features that greatly increase the flexibility and utility of the present invention over that of the prior art without driving the costs to socio-economically unacceptable levels. Another object of the present invention is to enable very high volumes of users, both transmitters and receivers, without conflict or false signaling. A further object of the invention is to enable simultaneous monitoring of more than one transit vehicle. Yet another object of the present invention is to enable system upgrades without requiring replacement or retooling of existing capital equipment. A further object of the invention is the enabling of a lock-out, which permits one monitored channel to be disabled or locked out for a predetermined time period. Another object of the invention is to enable capacity for data transmission or exchange through the use of unique codes and headers.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
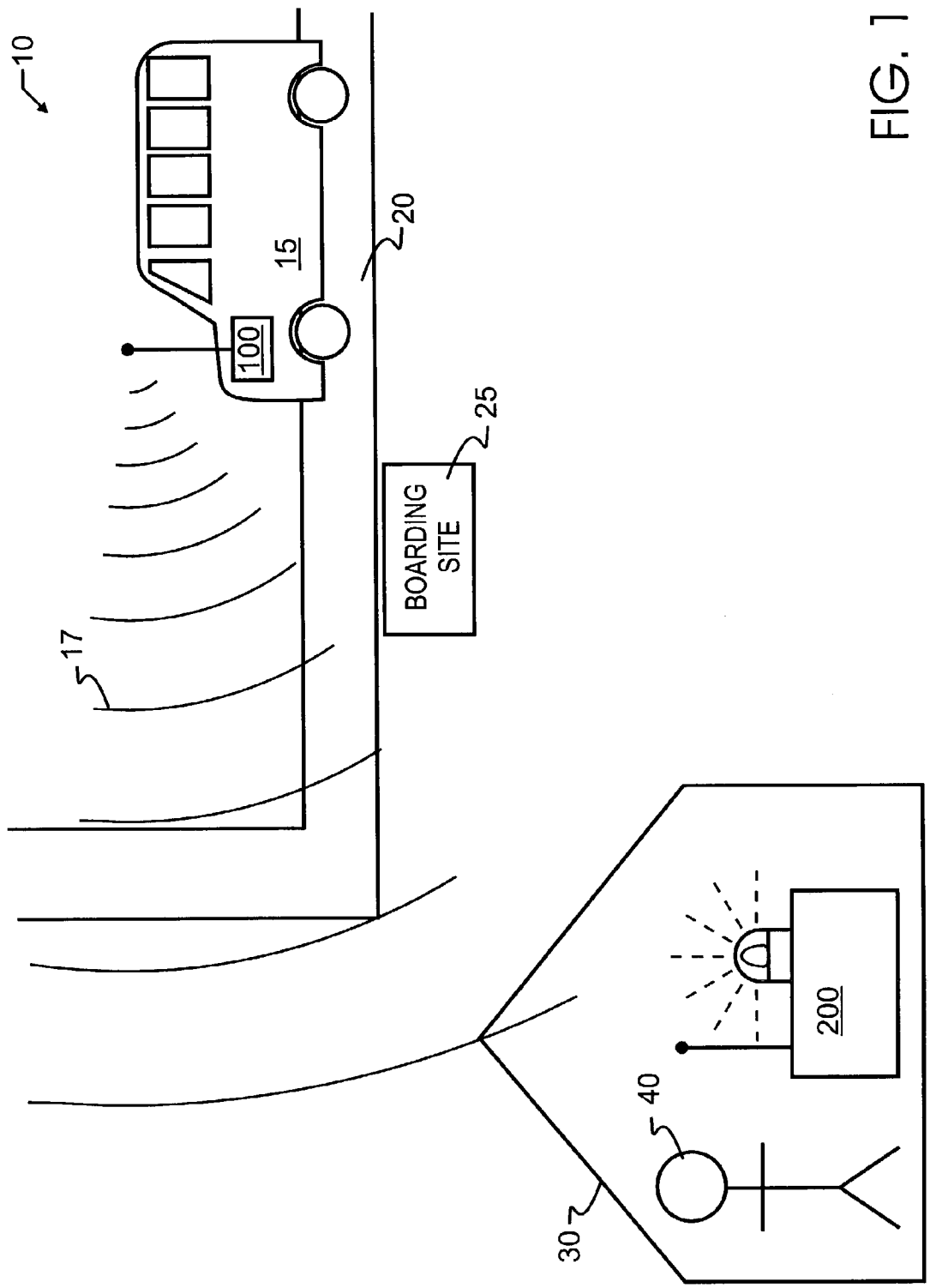
FIG. 1 schematically illustrates a preferred system for detecting the approach of a specific vehicle designed in accord with the teachings of the present invention.

Manifested in the preferred system 10 for detecting the approach of a vehicle 15, the present invention provides a relatively low-powered vehicle-carried transmitter unit 100. The particular power level which may be required will depend upon the size of the route traveled, relative spacing between intended stops and the like, though for the purposes of illustration only and not limiting thereto, in the preferred embodiment a transmitter operating at approximately 433 Mhz may be powered for short burst transmissions at a peak power level that will typically be within a range of 100 milliwatts and 5 Watts. Those skilled in the art will understand that this power level will also be dependent upon the sensitivity of receivers 200 that transmitter 100 is being used in association with. For many urban or suburban applications, a range of only a few city blocks may be adequate for providing the intended notice, though much greater distances maybe desired, depending upon the most desirable lead times and size of the overall route. In other words, for a route which only encompasses a few block radius, transmitter power levels may be decreased and/or receiver sensitivity decreased such that receivers such as receiver 200 will not be continuously activated. For rural routes that span many miles, much higher transmitter power levels and receiver sensitivities will produce greater advance notice.

While a bus is illustrated in FIG. 1 as the preferred transit vehicle 15, any other types of transit vehicles will be understood to be included, as described herein above and in the references incorporated herein by reference. Consequently, thoroughfare 20 may be a road, river, or even air in the case of an airplane. Transit vehicle 15 will be understood to be any type of vehicle which is designed for carrying a passenger 40. Furthermore, transit vehicle 15 will also be understood to encompass other types of vehicles that are instead be provided for such industry as the transport of packages or for other application.

Passenger 40 will most preferably be located within audible or visual range of receiver 200, such as within a shelter 30. Shelter 30 may include a house, apartment or other dwelling, but is not limited thereto. In fact, receiver 200 may be designed to be portable and bodily-carried by passenger 40, if so desired. Nevertheless, for many typical applications, it is anticipated that shelter 30 may be a dwelling. Transmitter 100 will generate a signal such as radio waves 17, which at some finite distance will be within range of reception of receiver 200. This will in turn trigger receiver 200 to notify passenger 40. The method of notification in preferred system 10 is a combination of sound and light, and may be switched therebetween to signal different distances. In other words, a first visual alarm may be triggered, followed by a subsequent audible alarm as the transit vehicle 15 gets sufficiently closer to cross another threshold. Most preferably, the notification will be sufficiently advanced to permit passenger 40 to reach boarding site 25 at the same time or just slightly before transit vehicle 15. In one method conceived herein, the invention will have application to persons affiliated with the passenger, such as parents or guardians who will be meeting their child at a bus stop, or care-givers who may be similarly expecting a person under their care to arrive. Using the preferred system 10, both the passenger 40 and a guardian or care-giver may obtain advance notification.

Figure 2:
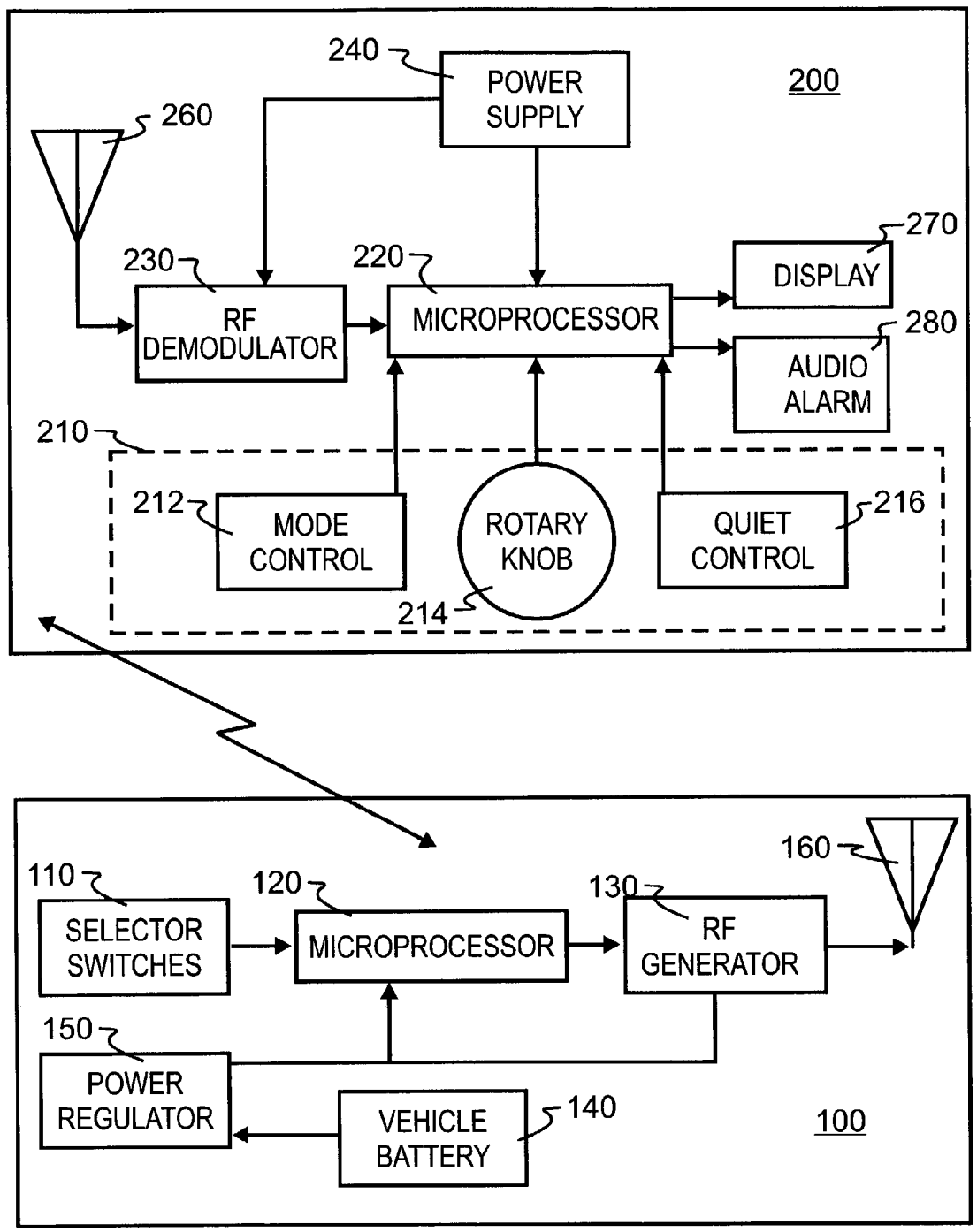
FIG. 2 illustrates a preferred transmitter and receiver pair used in the preferred system of FIG. 1 by block diagram.

FIG. 2 illustrates the most preferred transmitter 100 and receiver 200 by block diagram. Those skilled in the art of electrical communications will recognize that the internal components are preferred, but that there will be many known alternatives to each of the more basic components found therein. Transmitter 100 includes a power source 140, which in the preferred embodiment illustrated in FIG. 2 is the vehicle battery. Most vehicle power is fraught with noise and interfering spikes, and will frequently be of the wrong amplitude. Consequently, a power regulator 150 will be provided to ensure the appropriate potential and to protect against damaging spikes or noise. Microprocessor 120 will most preferably not only include the microprocessor chip, but all necessary associated components, which is known to depend upon the specific microprocessor. For example, crystal oscillators, resistors, filter capacitors, memory including volatile, non-volatile, magnetic and other known types, and any of a multitude of other components are known to be used in association with the microprocessor chip, and are understood to be include herewith. A means or method for selecting a particular unique identification will most preferably be provided to transmitter 100, and, in the preferred embodiment of FIG. 2, that method is through the inclusion of thumbwheel selector switches 110. These switches may frequently be Binary-Coded Decimal (BCD) switches, which for each switch will reproduce in binary digital form a representation of from zero to nine. Just one of these BCD switches would allow the transmitter ten different unique identifications, while two would allow 100, and so forth in powers of ten. Other means for selecting this code may be used as desired, including but not limited to keypads, other coded switches, keys or even received codes from another transmitter, to name just a few of the many possibilities.

Microprocessor 120 in preferred transmitter 100 will use selector switches 110 or other equivalent means to generate a unique transmitter code that uniquely identifies vehicle 15. Most preferably, the unique transmitter code will be generated immediately upon the application of power from vehicle battery 140, using appropriate programming of microprocessor 220, and, in such instance, power regulator 150 will desirably be connected through a key or ignition switch or the like. The transmitter code will be continuously or periodically conducted from microprocessor 120 to RF generator 130 for appropriate amplification, modulation and the like to boost the code to both Radio Frequency (RF) and sufficient power levels as described herein above. In the preferred embodiment, Manchester encoding is used together with a data transmission rate of 2400 baud. Microprocessor 120 will simply turn RF generator 130 on and off at the appropriate times. Given the foregoing data transmission rate, about 22 milliseconds are required to transmit the desired five bytes. Similar to other components, RF generator 130 may also take the form of an integrated circuit and all associated components, as this will simplify the construction, lower manufacturing costs, and provide similar benefits as are known in the art. The amplified RF signal is then transmitted through antenna 160 to produce radio waves 17 illustrated in FIG. 1.

In the preferred embodiment, microprocessor 120 will be programmed so that when selector switches 110 are set to a total value of zero, or, in the case of two or more BCD switches, each switch set to zero, microprocessor 120 will not communicate a code to RF generator 130, and will preferably disable transmission therefrom. In the preferred embodiment, microprocessor 120 will also selectively provide power to each one of the switches, when two or more are used. In such case, the outputs from each switch may be passed through blocking diodes, to permit microprocessor 120 to individually poll each switch and thereby reduce the numbers of input lines required into microprocessor 120.

A preferred message assembled by microprocessor 120 will include five bytes of data. The hex representation of the message will preferably be as follows:

| | |
|---|---|
| 41 | fixed header |
| 03 | remaining byte count |
| 0X | switch value |
| YZ | switch value |
| CC | checksum for the entire message |

To each byte of data, the microprocessor will preferably add a start bit and a stop bit. X, Y and Z represent the values that appear in selector switches 110, assuming three BCD switches, while the checksum CC allows receiver 200 to verify the integrity of the received message.

While radio waves are used in the preferred embodiment, other techniques of electrical communication through the ether are contemplated herein as well, and may include such techniques as directional microwave transmission, optical transmission including infra-red and laser techniques, or other diverse means and method. Distance-dependent transmission in the preferred embodiment provides a natural and low-cost method for establishing a threshold distance for triggering the receiver.

Receiver 200 in the preferred embodiment includes an antenna 260 and RF demodulator 230. RF demodulator 230 may be a single chip integrated circuit, or may include a variety of sections and stages including the various known heterodyning and demodulation techniques known in the art. Further, RF demodulator 230 does not have to include frequency shifting or demodulation, depending upon the nature of the signal being transmitted from transmitter 100. The output from RF demodulator 23 is conveyed in the form of a digital signal or word to microprocessor 220 for further processing.

Microprocessor 220 receives various human input through selection bank 210, which, in the preferred embodiment, includes mode control 212, a rotary selector knob 214, and a quiet control 216. These inputs are in the preferred embodiment achieved using interrupt processing, well known and documented in the field of microprocessors. In the preferred embodiment, mode control 212 and quiet control 216 may be implemented as simple switches. The human-understandable output is provided through display 270 and audio alarm 280, both which are well-known and understood in the field of microprocessors. In the preferred embodiment, display 270 will be implemented as an LCD display, though the myriad of display devices, including interactive devices such as touch screens and the like, are contemplated herein. Power supply 240 may simply be a wall outlet converter, though batteries or battery back-up and the like are contemplated herein.

In operation in accord with the preferred embodiment, microprocessor 220 is programmed for four modes of operations, including 'RECEIVE', 'SET CHANNEL', 'SET CODE', AND 'ENABLE/DISABLE'. The current operating mode may be indicated in display 270 and controlled through mode control input 212. Activating mode control input 212, which in the preferred embodiment is implemented by simply pressing a switch button, will cycle through each of the operating modes. Receiver 200 is not limited to these four modes of operation, and may include fewer or more modes as required for a particular application.

The normal mode, and preferably the one activated upon start-up, is the 'RECEIVE' mode. In this state, receiver 200 is waiting for appropriated coded transmissions from a nearby transmitter. If such a transmission is detected, which consists of RF demodulator 230 detecting an appropriate signal, an interrupt is sent to microprocessor 220. This will cause microprocessor 220 to attempt to decode the data, based on the previous settings and internal timers. Manchester encoding of the preferred five byte message allows receiver microcode to synchronize with the transmitted message. If the decoded signal is one which was previously selected for monitoring, microprocessor 220 will activate audio alarm 280.

When a person no longer wants to hear the alarm, 'QUIET' control 216 may be pressed to deactivate alarm 280 for the particular vehicle unique identification code. In the preferred embodiment, the 'QUIET' control will automatically disable activation on that code for thirty minutes.

Due to the routes which are often required to pick up all of the intended passengers, a transit vehicle 15 may often be forced to serpentine through a region. This serpentine pattern will cause prior art distance-based systems to falsely activate each time transit vehicle 15 gets close to receiver 200. In other words, receiver 200 will not only trigger the first time vehicle 15 gets within reception range, but will again trigger each time thereafter. The present invention overcomes this limitation by using microprocessor 220 through programming to nullify the active alarm, and provide a lock-out for a pre-determined or programmable time period. In the most preferred embodiment, this time period has been selected to be one-half of an hour, though those skilled in the art will understand that this time period may be of different duration or may be user-determined, depending upon the cost and complexity deemed acceptable or desirable for receiver 200.

Before detecting a transit vehicle 15, receiver 200 must first be directed to desired codes to receive. In other words, receiver 200 has the capability for receiving and correctly identifying a large number of transit vehicle codes. However, at any given time, only one or a select few codes will be of any interest to a particular passenger. Consequently, these particular codes need selected. In the preferred embodiment, this is accomplished using the 'SET CHANNEL' mode. Turning rotary knob 214 will scroll through the available channel numbers. These channel numbers represent the available quantity of codes that can be monitored at a given time. In other words, if receiver 200 is capable of monitoring for a total of eight different unique codes, then there will be eight available channels. Once a channel is selected, then the mode button is pressed to select 'SET CODE'. Once again, rotary knob 214 is turned until the desired transit vehicle code is selected. Contemplated herein is the ability to either display this data in code form, or to provide intelligent interpretation of the code for the application. This might, for exemplary purposes only and not limited thereto, take the form of logical text being displayed for the corresponding route. For example, the code may be 531, but that might represent the "downtown" city bus. Rather than displaying "531", "downtown" or other similar more descriptive text, hereinafter referred to as logical text which conveys either through words or abbreviations recognizable meaning, may alternatively be displayed, once again depending upon the complexity and pricing desired for receiver 200 and system 10.

When the desired code is displayed, activating mode control 212 once again until 'RECEIVE' is displayed will select the particular code. The foregoing procedure may be used to set transit vehicle codes for as many channels as are available. In the preferred embodiment, there are eight channels, though more or less may readily be implemented in light of the present disclosure.

At some point, a person may want to temporarily disable detection of a specific vehicle code. To do this, one first puts receiver 200 in the 'SET CHANNEL' mode, turns rotary knob 214 to select the desired channel, pressing the mode button to put receiver 200 in 'ENABLE/DISABLE' mode, and finally turning rotary knob 214 to change the status to either enable or disable status. To return to normal operation, a person must only activate mode control 212 until receiver 200 is again in 'RECEIVE' mode.

Figure 3:
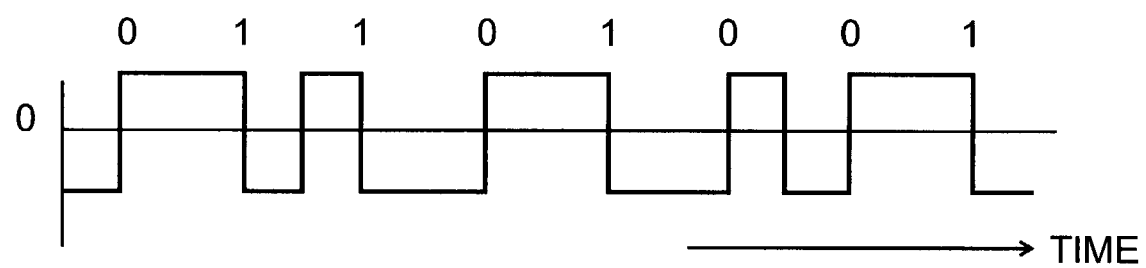
FIG. 3 illustrates a preferred coding technique.

A sample Manchester code is illustrated in FIG. 3. This code, as aforementioned, permits internal synchronization. The code suppresses dc and low-frequency signal components.

The use of the five byte word of the present invention permits additional novel flexibility. More particularly, herein above the hex representation 41 designates a fixed header. This header may be altered for different purpose, which permits a wide range of transmitted and received functions. For example, a unique header may be selected that designates a message corresponding to the current time and date. Use of this header will cause all receivers within range to time synchronize. Bus codes and route information may be transmitted to each receiver using a different header code value. So, for example, the bus ID "531" referenced above that corresponds to "downtown" may be set or changed through transmitted information using the unique header. Text messages may be similarly sent, and special configuration information or reprogramming may similarly be transmitted. One particularly beneficial feature contemplated herein, though somewhat more expensive, is the ability to equip both vehicles and passengers with full transceivers, each including hardware similar to both transmitter 100 and receiver 200. In such instance, it would be possible to transmit text both to and from the transit vehicle 15. In some cases, such as school bus routes where the passenger will not be taking the bus, the bus may then be alerted without having to stop and wait for any passenger. In the case of commercial delivery services, it is commonplace for a courier to be obligated to stop at each major customer for pick-up, regardless of whether any packages are to be dropped off or picked up. Using the capability of the present unique headers and bi-directional communication, such unwarranted courier stops may be avoided.

While the foregoing details what is felt to be the preferred embodiment of the invention, no material limitations to the scope of the claimed invention are intended. Further, features and design alternatives that would be obvious to one of ordinary skill in the art are considered to be incorporated herein. For example, the numbers and possibilities for the type of modulation are nearly limitless, including Amplitude Modulation, Frequency Modulation, Frequency Shift Keying, Phase-Shift Keying, spread-spectrum, and the myriad of other techniques. The operating frequencies are equally as variable, dependent upon the desired transmission characteristics, power and range, as well as available spectrum for the present use. Other similar variables too numerous to specifically mention are considered incorporated herein. Consequently, the scope of the invention is set forth and particularly described in the claims hereinbelow.

We claim:

1. A system for detecting the approach of a vehicle, comprising:
   a vehicle transmitter which operatively transmits at least one code beyond said vehicle transmitter;
   a code generator that generates a representative code selected from a plurality of codes which is representative of said vehicle transmitter and discernable from others of said plurality of codes, said code generator operatively coupled to said vehicle transmitter to couple said representative code to said vehicle transmitter for transmission of a signal therefrom;
   a receiver remote from said vehicle transmitter having a signal receiver operatively monitoring transmitted signals from said vehicle transmitter at a signal strength at said receiver of at least a first threshold and having a code demodulator responsive to said signal receiver extracting said representative code from said signal;
   a code detector comparing said representative code to at least one user-selected code and generating an indication of identity therewith; and
   a lock-out for preventing said generation of indication of identity with said at least one user-selected code.

2. The system for detecting the approach of a vehicle of claim 1 wherein said representative code further comprises a code which uniquely identifies said vehicle transmitter.

3. The system for detecting the approach of a vehicle of claim 2 wherein said uniquely identifying code is transmitted using Manchester coding.

4. The system for detecting the approach of a vehicle of claim 1 wherein said code detector further comprises comparing said representative code to a plurality of user-selected codes and generating an indication of identity with any of said plurality of user-selected codes.

5. The system for detecting the approach of a vehicle of claim 1 wherein said code generator further generates a header within said at least one code.

6. The system for detecting the approach of a vehicle of claim 5 wherein said header further comprises a unique code to set synchronizing said receiver with said vehicle transmitter with respect to at least one data field.

7. The system for detecting the approach of a vehicle of claim 6 wherein said at least one data field further comprises date.

8. The system for detecting the approach of a vehicle of claim 6 wherein said at least one data field further comprises logical text associated with said representative code.

9. The system for detecting the approach of a vehicle of claim 6 wherein said at least one data field further comprises system configuration data.

10. A means for alerting a person to a proximity of a transmitter at a first instant of time, comprising:
    a transmitter and a receiver spatially disparate to said transmitter, said transmitter and receiver tuned to a common transmission signal;
    a threshold of said common transmission signal detectable by said receiver;
    a code carried by said common transmission signal identifying said transmitter and detectable by said receiver;
    a means within said receiver for comparing said code to a plurality of stored values and responsive to a match therewith generating a signal indicative of a match; and
    a means to prevent at least one of said plurality of stored values from being included in said match signal generating.

11. The means for alerting a person to a proximity of a transmitter of claim 10, wherein said transmitter further comprises a transit vehicle.

12. The means for alerting a person to a proximity of a transmitter of claim 11, wherein said person further comprises a potential passenger.

13. The means for alerting a person to a proximity of a transmitter of claim 10, further comprising a means for detecting the elapse of a time interval, and, responsive thereto, disabling said preventing means.

14. The means for alerting a person to a proximity of a transmitter of claim 10, wherein said code uniquely identifies said transmitter.

15. The means for alerting a person to a proximity of a transmitter of claim 10, wherein said code further comprises an identification of said transmitter, and further comprises a header which identifies an application of said message data.

16. The means for alerting a person to a proximity of a transmitter of claim 10, wherein said transmitter starts transmitting said common transmission signal upon energization thereof and said receiver starts receiving said common transmission signal upon energization thereof.

17. The means for alerting a person to a proximity of a transmitter of claim 10, further comprising a means for detecting a transmission collision and re-transmitting said common transmission signal responsive thereto.

18. A system for detecting the approach of a vehicle, comprising:
    a vehicle transmitter which operatively transmits at least one code beyond said vehicle transmitter;
    a code generator that generates a representative code selected from a plurality of codes which is representative of and uniquely identifies said vehicle transmitter and is discernable from others of said plurality of codes, said code generator operatively coupled to said vehicle transmitter to couple said representative code to said vehicle transmitter for transmission of a Manchester coded signal therefrom;

a receiver remote from said vehicle transmitter having a signal receiver operatively monitoring transmitted signals from said vehicle transmitter at a signal strength at said receiver of at least a first threshold and having a code demodulator responsive to said signal receiver extracting said representative code from said signal; and a code detector comparing said representative code to a plurality of user-selected codes and generating an indication of identity with any of said plurality of user-selected codes; and a lock-out for preventing said indication of identity with at least one of said plurality of user-selected codes for a first time interval.

* * * * *